(No Model.) 5 Sheets—Sheet 1.
M. V. B. ETHRIDGE.
MACHINE FOR MARKING MAIL MATTER.
No. 378,391. Patented Feb. 21, 1888.
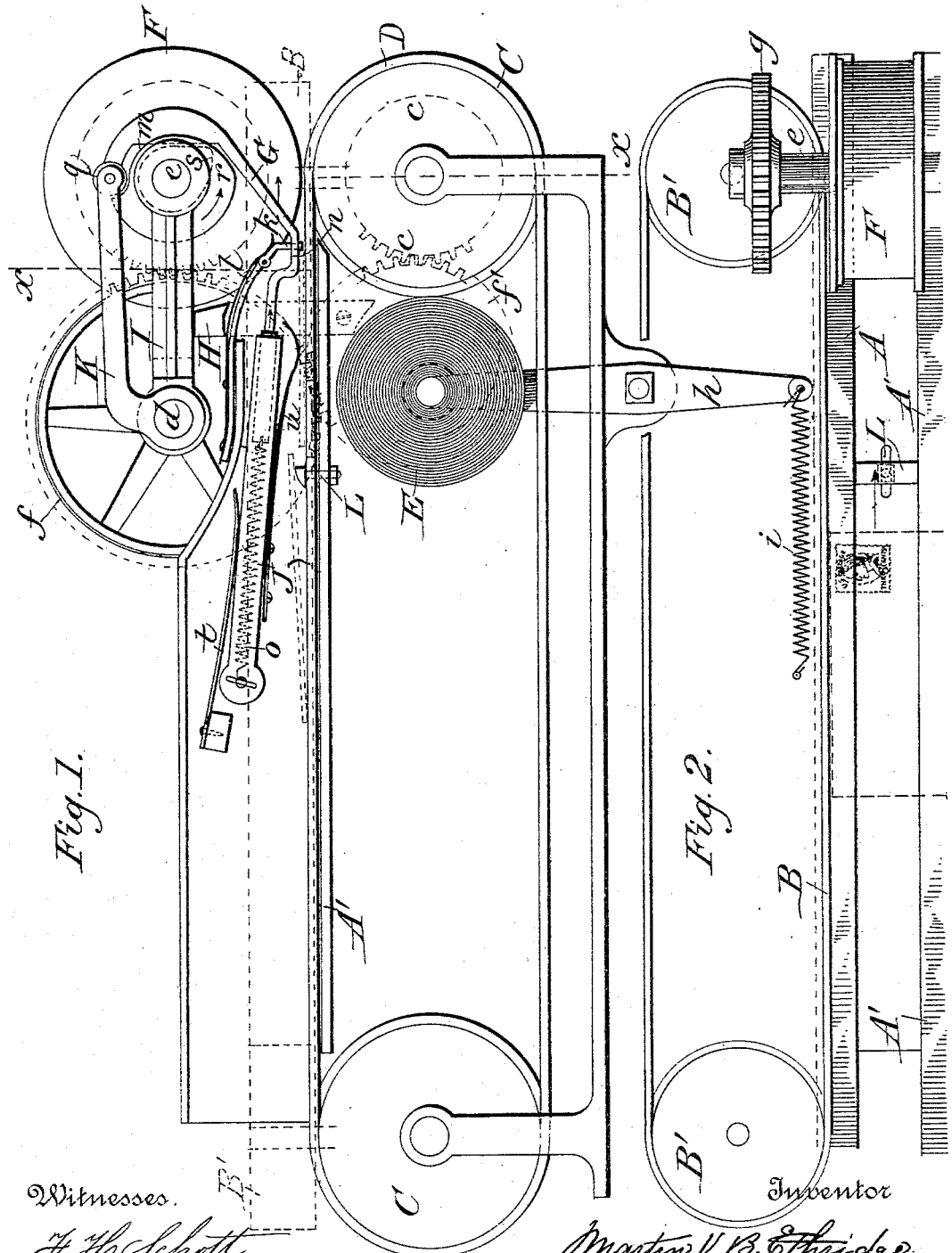
Witnesses.
F. H. Schott.
Fred E. Tasker.
Inventor
Martin V. B. Ethridge,
By his Attorney John C. Tasker.

(No Model.) 5 Sheets—Sheet 2.
M. V. B. ETHRIDGE.
MACHINE FOR MARKING MAIL MATTER.

No. 378,391. Patented Feb. 21, 1888.

Witnesses
F. H. Schott
Fred E. Tasker.

Inventor
Martin V. B. Ethridge
By his Attorney, John C. Tasker.

(No Model.) 5 Sheets—Sheet 3.

M. V. B. ETHRIDGE.
MACHINE FOR MARKING MAIL MATTER.

No. 378,391. Patented Feb. 21, 1888.

Witnesses
F. H. Schott
Fred. E. Tasker

Inventor.
Martin V. B. Ethridge,
By his Attorney, John C. Tasker (No Model.) 5 Sheets—Sheet 4.
M. V. B. ETHRIDGE.
MACHINE FOR MARKING MAIL MATTER.
No. 378,391. Patented Feb. 21, 1888.
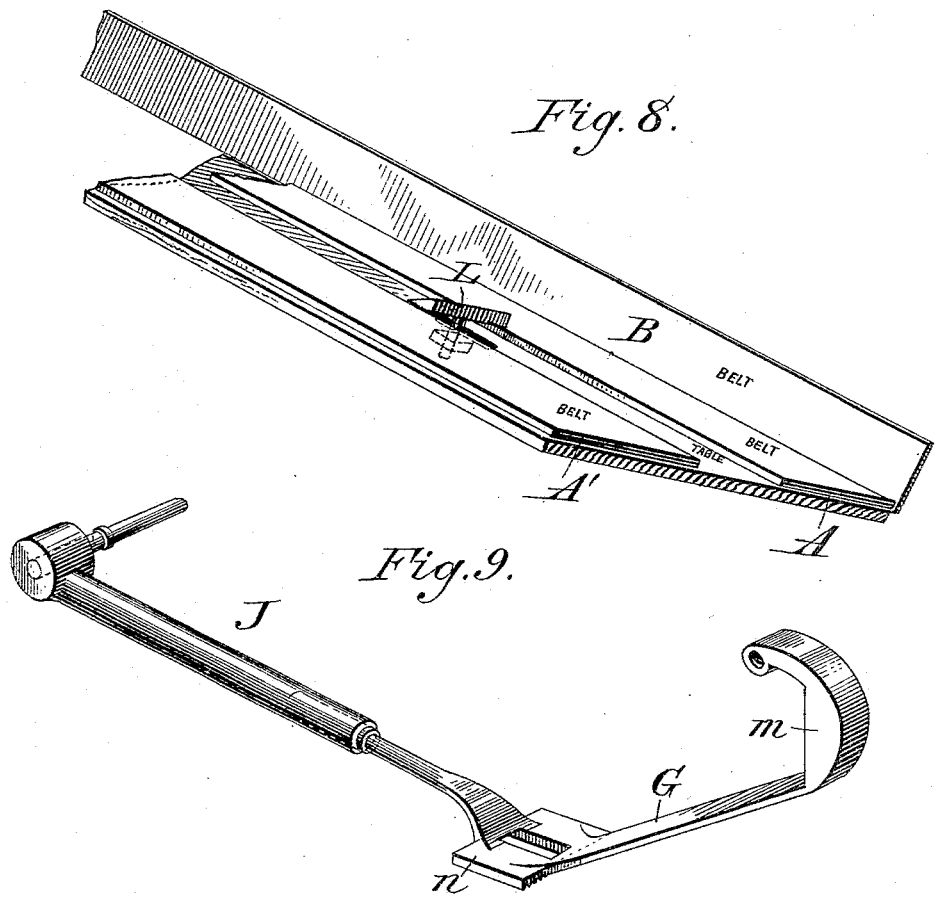
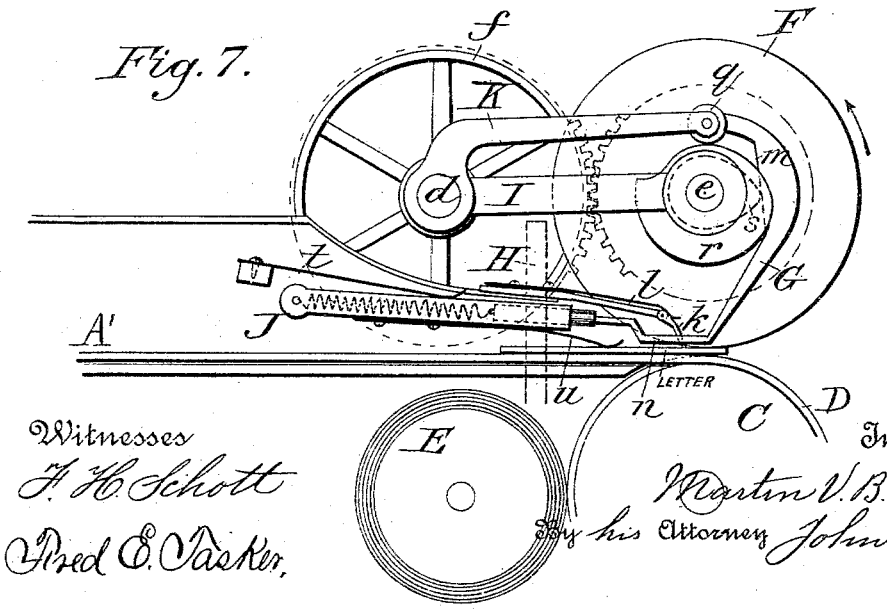
Witnesses
F. H. Schott
Fred E. Tasker
Inventor
Martin V. B. Ethridge
By his Attorney John C. Tasker (No Model.) 5 Sheets—Sheet 5.

M. V. B. ETHRIDGE.
MACHINE FOR MARKING MAIL MATTER.

No. 378,391. Patented Feb. 21, 1888.

Witnesses
F. H. Schott
Fred. E. Tasker

Inventor,
Martin V. B. Ethridge
By his Attorney John C. Tasker

N. PETERS, Photo-Lithographer, Washington, D. C.

UNITED STATES PATENT OFFICE.

MARTIN V. B. ETHRIDGE, OF BOSTON, MASSACHUSETTS.

MACHINE FOR MARKING MAIL MATTER.

SPECIFICATION forming part of Letters Patent No. 378,391, dated February 21, 1888.

Application filed April 8, 1886. Serial No. 198,229. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Machines for Stamp-Canceling and Postmarking Mail Matter; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to machines for stamp-canceling and postmarking letters, cards, and other mail matter, and delivering the same for sorting and distribution to the mails by one continuous series of appropriate mechanical operations; and the invention consists in the construction, arrangement, and combination of parts, substantially as will be hereinafter described and claimed.

Figure 3:
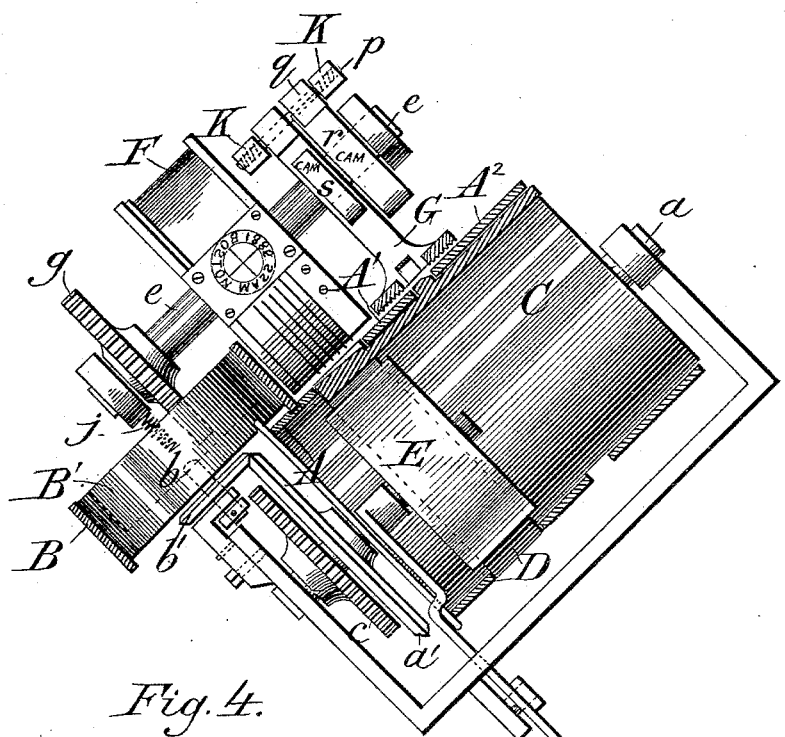
Figure 4:
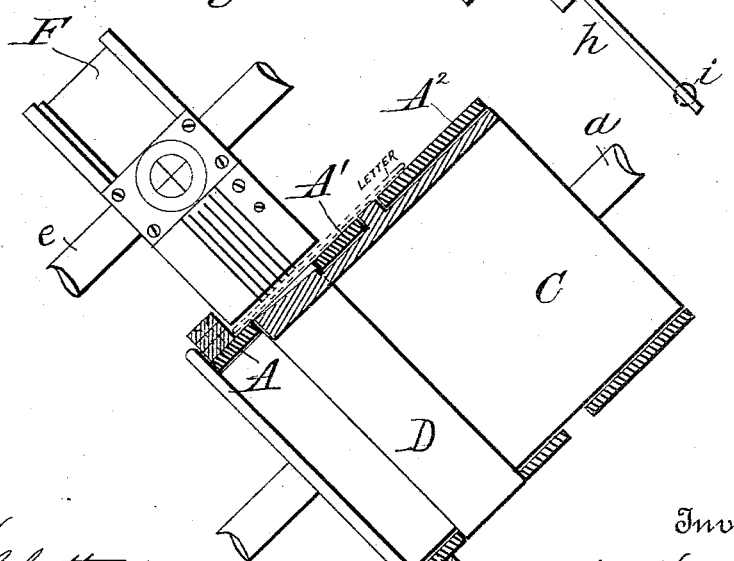
Figure 5:
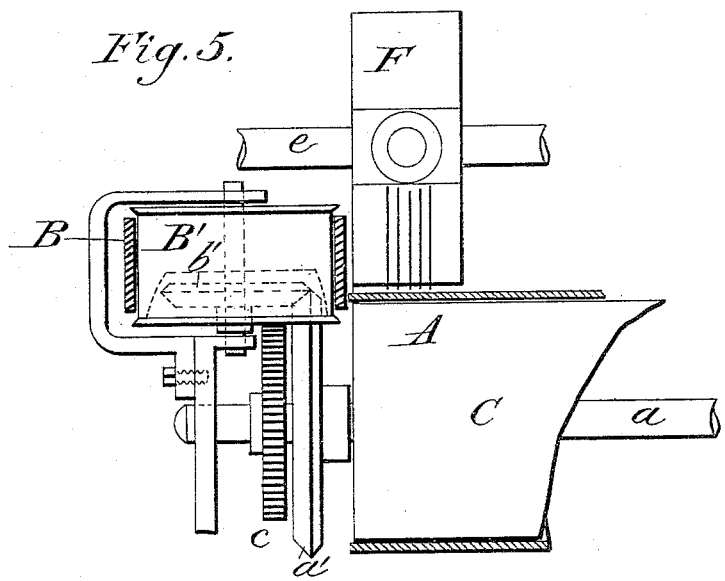
Figure 6:
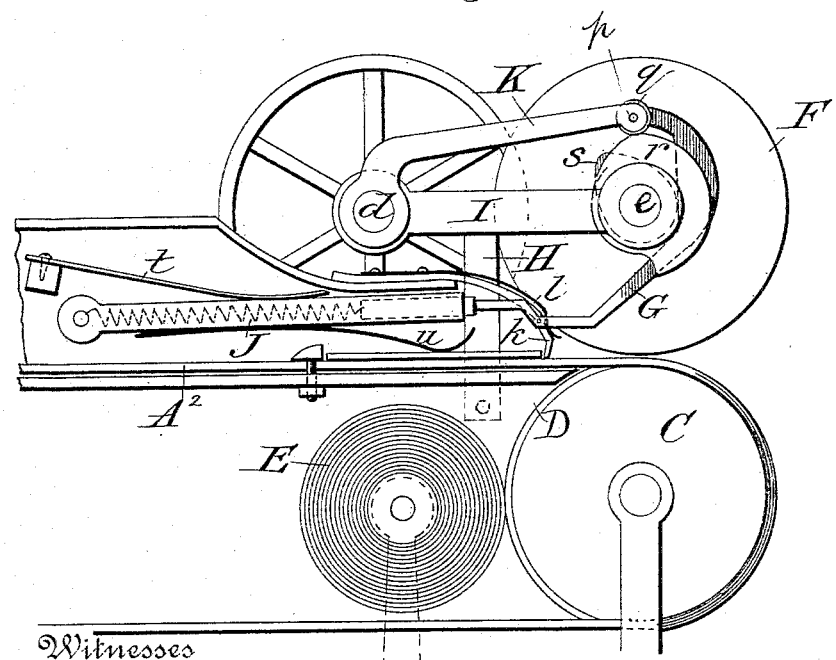
Figure 10:
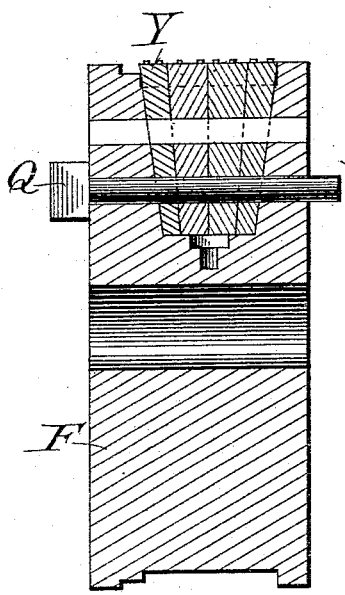
Figure 11:
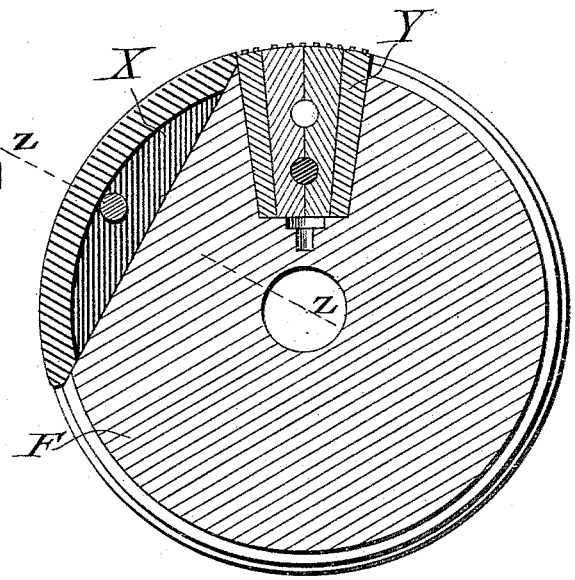
Figure 12:
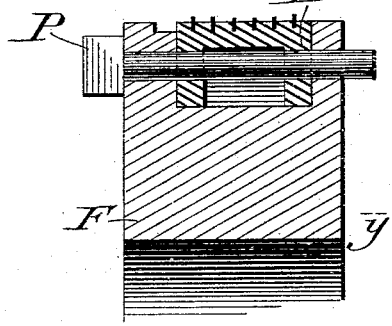
Figure 13:
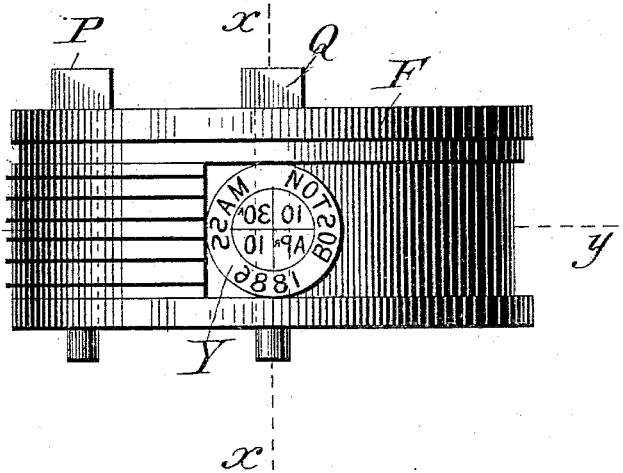

In the annexed drawings, illustrating my invention, Figure 1 is a side view, in an upright position, of the postmarking and stamp-canceling cylinder, the clamping-feet, the feeding-support, the projecting knob in the letter-path, the blotter or roller for absorbing whatever ink happens to fall upon the smooth surface of the pressure-roll, and the accompanying parts. Fig. 2 is a top view showing the divided belt and the knob in the letter-path, said belt being horizontally placed. Fig. 3 is a sectional left-end elevation on the line $x\ x$ of Fig. 1. Fig. 4 is a similar view, including but a portion of the parts, and intended to represent the close juxtaposition of the printing-cylinder and the surface of the impression-roll, which lies between the sections of the divided belt. Fig. 5 is a cross-sectional diagrammatic representation of the feeding letter-carrier. Fig. 6 is a side view of the mechanism of Fig. 1 in the upright position therein shown, and represents the relative location of the parts of said mechanism when a letter is being retarded by the timing-lever. Fig. 7 is a similar view showing the position of the parts when the letter is passing between the type-cylinder and impression-roll. Fig. 8 is a perspective view of the conveying-belts and the knob in the letter-path. Fig. 9 is a perspective view of the clamping-foot. Fig. 10 is a transverse section of the type-cylinder on line $x\ x$ of Fig. 13. Fig. 11 is a longitudinal section of the type-cylinder on line $y\ y$ of Fig. 13. Fig. 12 is a partial transverse section of the same on line $z\ z$ of Fig. 11, and Fig. 13 is a face view of the type-cylinder.

Like letters designate like parts in the several figures.

The moving support for conveying the letters to the postmarking and stamp-canceling mechanism comprises a shouldered belt or its equivalent, one form of which is represented in the drawings as consisting of two or more belts, as A, A', and A², mounted on rolls C C, by means of which they are actuated, said belts and rolls being preferably situated in an inclined position, as are also the printing-cylinder F and its accompaniments.

The belts A and A' are so separated as to leave an intervening space between them directly below the printing-cylinder, and of sufficient width to allow a steel or other metal or smooth annular surface, D, upon one of the rolls C to project through said space onto a level with the upper surface of the bands, it being further noted that the said roll C is located beneath the printing-cylinder F and serves as an impression-roll as well as a band-carrying roll or driver. The belts thus separated render no less effective service as a carrier for the letters, and the arrangement possesses the advantage of removing the belting from beneath the printing-dies, and avoids any possibility of a chance or inadvertent contact between the dies and the belts, thus keeping the latter always clean, and consequently the mail matter unsoiled.

The postmarking, stamp-canceling, or type-carrying cylinder F is mounted in a rocker-frame, I, which is fulcrumed upon a shaft, $d$, that carries a gear, $f$, for engaging a gear, $g$, upon the shaft $e$ of the said type-cylinder, and by means of these connections the cylinder F is subjected to a continual revolution, since the gear $f$ meshes with a gear, $f'$, which in turn engages the gear $c$ upon the driver-shaft. The type-cylinder rotates as near as possible to the pressure-roll without touching it. In order to permit of this close proximity without contact, an upright or post, H, is secured to the frame, upon which the rocker-frame I may rest. The thinnest letter will fill the space between the type-cylinder and the impression-roll, and therefore be printed when conveyed between them. Thicker letters or packages will in their passage raise the type-cylinder and rocker-frame away from the lower roll and off the rest H. After the letter is printed the weight of the cylinder will replace the rocker-frame upon the rest and the cylinder into close proximity to the lower roll, as before, A spring, as shown in Fig. 3, may also be used to assist in replacing the type-cylinder.

Although the printing-cylinder is situated very close to the impression-roll, yet it is not so close that any ink will be deposited upon the latter; but during the rapid operation of the machine should any slight amount of ink happen to fall accidentally upon the roll, provision is made for its removal in the shape of a paper roll, E, wound on a central core that is journaled into a pivoted lever, $h$, so held under the tension of a spring, $i$, as that the blotter-pad or absorbing agent may bear at all times with a constant even pressure upon the roller C, as shown in Fig. 1.

The letter, card, newspaper, or similar package is guided surely to a yielding timing-lever, $k$, that is pivoted to a suitable support, and is provided with a spring, $l$, by which it is returned to its depending position after the letter has passed. It will be understood that each letter is stopped at its forward end by the timing-lever $k$, and that the letter remains in that position until the rotation of the type-cylinder F has brought its type and canceling-dies nearly to the point where their impression is to be made. The letter or other package is propelled past the timing-lever by means of a clamping-foot whose form is preferably similar to that shown in Fig. 9. It consists of a peculiarly-shaped construction, G, the forward end being bent to the proper curvature and provided with a terminal journal-bearing, while the inner surface is plane-faced at $m$, the other end being formed as a rod or spindle and the intermediate portion being fashioned as a slotted plate or disk, $n$, whose lower surface is preferably corrugated, milled, or grooved to increase the traction upon the letter. The spindle portion of the foot enters a tubular box, J, which is pivoted to the frame, and is provided interiorly with a spring, $o$, secured to the end of the spindle, and by means of which the latter is withdrawn into the box whenever the mechanism which operates to draw the foot forward ceases to act. A spring, $t$, secured to the frame bears upon the upper surface of the tubular box and assists in depressing the same, so that the foot will be held in contact with the letter, and a forwardly-depending guide or pressure-arm, $u$, is attached to the under part of the box J and presses upon the letter to prevent its rebounding when the timing-lever strikes its forward end after leaving the preceding piece of mail matter. The slot in the plate $n$ is provided for the purpose of allowing the timing-lever to pass through into the letter-path.

Through the journal-bearing in the upper end of the casting that forms the clamping-foot is passed a shaft, $p$, Fig. 3. A rocker-arm, K, is mounted at one end upon the shaft $d$, while the other end is perforated for the passage of the shaft $p$, said end being cleft or bifurcated in order that a roller, $q$, and also the upper end of a clamping-foot, may be mounted upon said shaft $p$, intermediate between the prongs of the bifurcated end, as shown best in Fig. 3.

The shaft $e$, above described, carries two cams, $r$ and $s$, rigidly secured thereon and situated relatively to each other, as shown in the drawings. The cam $s$ is situated in line with the face $m$ on the clamping-arm, and is adapted to ride upon this face, and thus push the clamping-foot horizontally forward. The cam $r$ is situated in line with the roller $q$, which bears upon it, and the revolution of said cam raises and depresses the arm K, and hence raises and lowers the clamping-foot. As the letter is conveyed along by the moving bands and retarded at the timing-lever, it is caught by the clamping foot or feet, the timing-lever is pushed aside, and the letter drawn beneath the printing-cylinder, the cam $s$ pushing the foot far enough forward to accomplish this purpose. When it is firmly caught between the printing and the impression cylinders, the cam $r$ will act on the roller $q$ to raise the foot off the letter, and the timing-stop will fall into place for the next letter. The movements of all the parts are so regulated that when a letter is drawn forward by the belt and feet the canceling-dies on the cylinder F will be in proper position to make their impression at the proper points.

In the letter-path, between the bands A and A', is situated a knob, L, fastened to that part of the frame beneath the bands and at the proper distance from the type-cylinder. It is preferably formed with an inclined rear face and a perpendicular forward face. The purpose of the knob is to prevent a letter, card, or other piece of mail matter from riding under the piece next ahead when the latter is detained for an instant at the timing-stop, for the knob elevates the forward end of each piece of mail matter and allows it to drop upon the preceding letter, so that it will be in position to be retarded by the timing-lever when it is reached.

The postmarking and stamp-canceling cylinder F carries a detachable stamp-canceling die, X, and a detachable postmarking-die, Y, as shown in Figs. 10, 11, 12, and 13. The steel canceling-die X is preferably formed with a series of parallel lines, as shown, that occupy a space of sufficient length and width to insure the proper cancellation of a series of stamps on an envelope. The die is shaped as shown in Fig. 11, and is inserted into a transverse slot on the periphery of the type-cylinder and held in place by means of a transversely-situated pin, P. (See Fig. 12.) The steel postmarking-die Y is also detachable, and consists of a cylindrical or conical tube, which is received into a correspondingly-shaped radial hole or slot in the periphery of the cylinder, and upon whose outer circular end are delineated the year and post-office name. This tube is adapted to contain the type that are required to indicate the month, day, and hour of mailing, the same being held therein by any suitable means, and the tube itself being secured in the cylinder by any convenient device, such as the pin Q. The construction of the tubular postmarking-die renders it readily removable. Furthermore, by the use of the detachable canceling-die above described the operator is enabled to remove it from the cylinder with ease and rapidity when it is desired to use the machine for printing the "receiving" mark upon the backs of letters instead of for canceling and postmarking.

Having thus described my invention, what I claim as new, and desire to secure by Letters Patent, is—

1. The combination, with a feed-belt for the letters, cards, or other mail matter to be acted upon, of a projection or knob located in the letter-path at a sufficient distance from the printing mechanism to raise the forward end of each individual piece of mail matter so that it will be superimposed on the preceding piece, substantially as described.

2. The combination of the separated bands A and A', the stationary knob L, projecting between said bands, the impression-roll C, having the smooth annular surface D, likewise situated between said bands, the downwardly-projecting pivoted timing-lever k, provided with a spring, l, and the printing-cylinder F, all arranged to operate substantially as described.

3. The combination of the printing-cylinder F, the rocker-frame I, and the support H for the same, of the clamping-foot G, the rocker-arm K, the tubular box J, and mechanism consisting of cams upon the cylinder-shaft, whereby the said clamping-foot is actuated to introduce the letter or card between the type and impression cylinders, substantially as herein described and shown.

4. The combination of the rocker-frame I, fulcrumed upon the shaft d, the supporting-post H, the printing-cylinder F, mounted rigidly on a shaft, e, journaled in the rocker-frame and provided with cams r and s, the rocker-arm K, clamping-foot G, and tubular box J, horizontally depressed by a spring, t, and having a forwardly-extending pressure-guide, u, substantially as shown and described.

5. The combination of the conveying-belts, the clamping-foot having a plane-faced portion at m, a spindle portion, and an intermediate plate, n, the tubular box for receiving the spindle portion, the retracting-spring, and suitable cam mechanism, substantially as described, for actuating said foot for the purpose of moving it horizontally forward until the letter is caught between the type and impression roll and then elevating the foot off the roll, as set forth.

6. In a postmarking apparatus, the clamping-foot G, provided with a slotted plate, n, through which the timing-lever extends into the path of the letter, in combination with a tubular box inclosing the spindle portion of the foot and held in a horizontally-depressed position by a pressure-spring, and actuating mechanism, substantially as described, for pushing the foot forward and elevating it at proper intervals, as set forth.

7. The combination, with a driving or impression roll, C, having an encircling smooth surface, D, of a blotting-roller, E, journaled into a pivoted shaft, h, so held by a spring, i, that the roller E will bear against the surface D, substantially as described.

8. The combination, with the printing-cylinder F, having a transverse slot upon its peripheral surface, of a detachable and removable canceling-die, X, held within said slot by means of a pin, P, substantially as described.

9. The combination, with the moving support for the letters, cards, &c., and the table beneath the same, of a rearwardly-inclined knob having a perpendicular forward face and secured upon the table and in the letter-path, substantially as and for the purposes set forth.

10. The combination, with the divided belts, of the projecting knob located between them, said knob being formed with an inclined rear face and a perpendicular forward face, substantially as specified.

In testimony whereof I affix my signature in presence of two witnesses.

MARTIN V. B. ETHRIDGE.

Witnesses:
CHAS. HALL ADAMS,
CHARLES NICHOLS.